Sept. 17, 1929.  J. L. FINCH  1,728,403
ALTERNATOR FIELD CONTROL SYSTEM
Filed June 25, 1925
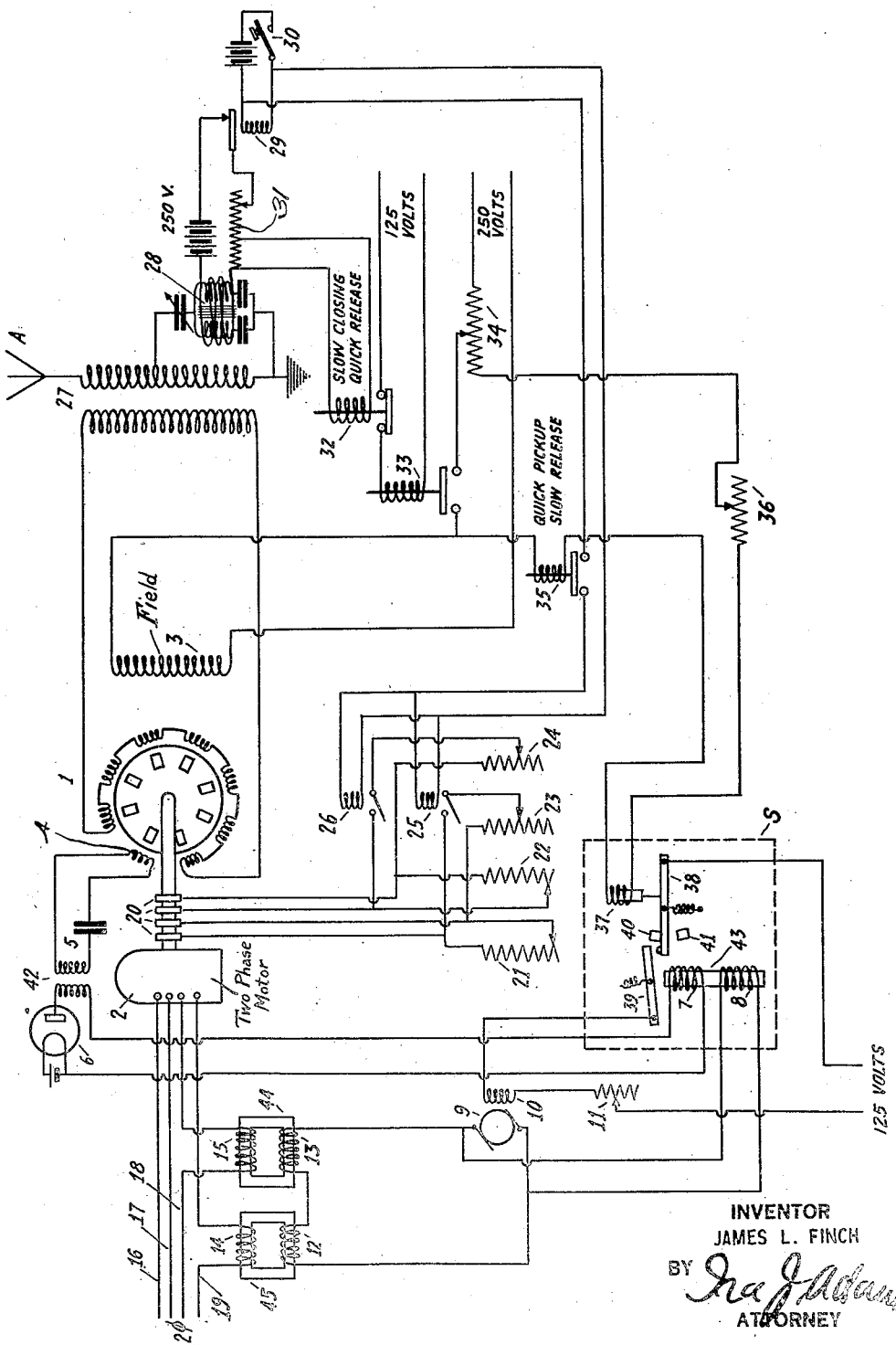
INVENTOR
JAMES L. FINCH
BY
ATTORNEY Patented Sept. 17, 1929

1,728,403

UNITED STATES PATENT OFFICE

JAMES L. FINCH, OF BROOKLYN, NEW YORK, ASSIGNOR TO RADIO CORPORATION OF AMERICA, A CORPORATION OF DELAWARE

ALTERNATOR-FIELD-CONTROL SYSTEM

Application filed June 25, 1925. Serial No. 39,581.

The invention concerns a system for transmitting high frequency signals and has for its principal object to provide an arrangement for removing the field from the high frequency alternator in such a system when no signals are being sent.

A further object of the invention is to provide an arrangement for removing the field from a high frequency alternator in a high frequency signaling system during the absence of signaling and to maintain the speed of the alternator substantially constant in spite of resulting variations in the load on its driving motor.

In modern high power radio transmitting systems which make use of alternators of the Alexanderson type as a source of high frequency energy the practice has been to leave the field on such alternators constantly in order that the system may be in readiness for signalling at any time. The motor driving the alternator is therefore under a substantial load regardless of whether signals are actually being transmitted or not thereby entailing substantial power losses and unusual depreciation of the system. It has not been feasible hitherto to provide for removing the field of the alternator during the intervals in which signals are not being sent owing to the effects of such sudden changes in load on the delicate speed regulating devices and the devices for compensating for keying. The speed of an alternator in a high frequency transmitting set must be regulated to a very fine degree to keep the station within its allotted wave length and to prevent difficulties in receiving its messages. A suitable system for regulating the speed of such an alternator is disclosed in U. S. patent to Alexanderson 1,400,847, December 20, 1921. In this system the alternator is driven by an induction motor whose speed is maintained constant by means of iron core induction coils placed in its supply lines, the inductance of the coils being varied by changing the magnetic saturation of their cores. The saturation of the cores is changed by coils wound thereon and connected to a direct current generator whose voltage is controlled by a device responsive to tendencies to variation in the frequency of the alternator. Owing to the necessity for constant speed of the alternator these controlling devices are somewhat delicately adjusted and an attempt to remove the field of the alternator whenever signals cease will interfere seriously with their operation owing to the fact that every time the field is switched on or off there is a consequent change in the load on the driving motor and therefore a tendency for variation in speed.

The changes in alternator load due to keying must also be compensated for and this may be done by rheostats connected in the rotor circuit of the induction driving motor which are switched in and out of circuit by the keying operation. This switching operation must of course be substantially simultaneous with the operation of the keying device as the openings and closings of the keying circuit follow each other with great rapidity during the sending of a message. Now if the alternator field were removed when no message was being sent and were switched on only when the operator began to key another message, the alternator field current would not reach its full strength at once but would require an appreciable time to reach this value owing to the inductance of the circuit. When keying starts, then, the compensating rheostats would become operative at once and before the alternator field had reached its full strength. Unless some means were provided to delay the operation of the compensating devices at the beginning of signaling, therefore, the compensation would commence before there was need of it thereby resulting in another source of disturbance in the motor speed or alternator frequency regulating system.

According to the present invention the field of such alternators is automatically removed a short time after the signaling ceases and automatically restored substantially simultaneously with the resumption of signaling. The tendencies for variation in speed noted above are corrected for by a suitable means co-acting with the speed regulating devices of the driving motor to prevent the subsequent changes in load from affecting its speed. More specifically a relay system associated with the keying circuit is provided so that a brief time interval after the keying ceases the alternator field is disconnected from its source of power and immediately on resumption of signaling the alternator field is automatically connected to the source of power. In connection with this relay system an additional coil is provided on the motor speed regulating device to compensate for the changes in load due to switching the alternator field on and off and an additional slow acting relay is provided to delay the operation of the compensating rheostats until the alternator field has reached its normal value. In this manner the field may be switched on and off the alternator and there will be no ill effects from the operation on any of the speed or frequency regulating devices.

The invention will be more clearly understood from the following detailed description which should be read in connection with the accompanying drawing in which the single figure illustrates a diagrammatic arrangement conforming to the invention.

In the figure A represents a transmitting antenna energized by the alternator 1 which is driven by a two phase induction motor 2. The field of the alternator is represented at 3 and the alternator is connected to the antenna circuit by a coupling 27. As usual in such a system a magnetic amplifier designated at 28 is connected across a portion of the inductance in the antenna circuit. This device consists of two parallel connected coils wound on a magnetic core whose saturation is varied by another winding controlled as shown in the drawing by a relay 29 whose coil is energized whenever the key 30 is closed. When the saturation coil of the magnetic amplifier is energized its core will be magnetically saturated and the parallel connected coils will have small inductance thereby short circuiting the alternator or detuning the aerial. Whenever the key 30 is in open position therefore very little power is impressed on the antenna system. When the key 30 is closed the saturation circuit of the amplifier is opened, owing to the action of the relay 29, the saturation of the core of the amplifier drops to a low value and the amplifier coils connected across the portion of the antenna inductance possess high inductive reactance thereby removing the short circuit from the alternator or in other words allowing the antenna to assume a tuned condition with respect to the normal frequency of the station. Whenever the key is depressed then power will be radiated from the antenna and when the key is open substantially no power will be so radiated.

When the key is being rapidly opened and closed to send a signal the load on the alternator 1 is rapidly changing resulting in a tendency to cause momentary changes in its speed and frequency. This tendency is compensated for by the compensating rheostats 23 and 24 which by means of the relays 25 and 26 are thrown in parallel with the running rheostats 21 and 22 whenever the key 30 is closed and removed from their parallel relationship every time the key 30 is opened. The circuit connecting the coils of the relays 25 and 26 to the keying circuit is further controlled in the present instance by relay 35 whose function will be explained hereinafter.

The speed of the alternator is further maintained constant by a speed regulator comprising an isolated coil 4 on the alternator which is connected to a circuit 5 tuned to the normal frequency of the alternator. This circuit is coupled through the coupling 42 to a circuit containing a rectifier 6 and a coil of the speed regulating device S. The device S comprises a pivoted contact 39 and a contact 38 which are brought into contact with each other whenever the core 43 is sufficiently magnetized. A coil 8, also wound around core 43, is connected to a control motor 9 having the saturation coils 12 and 13 in its output circuit. The field 10 of this motor is connected to an energizing source through the contact members 39 and 38. The saturation coils 12 and 13 are wound on magnetic cores 45 and 44 on which are also wound coils 14 and 15, respectively, and which are connected in the supply conductors of the motor 2. A change in current through the coil 12 and 13 will change the magnetization of the cores 45 and 44 and therefore the inductance of the coils 14 and 15. These changes in inductance will vary the voltage impressed on the motor. The effect of the arrangement will be to open and close the field circuit of motor 9 rapidly in response to tendencies of either the voltage of the motor 9 or the speed of the generator 1 to change thereby causing under normal conditions a constant speed of the driving motor 2 and also the alternator 1. In the present case the contact 38 is pivoted as well as contact 39 and has two operating positions defined by stops 40 and 41. The operating positions are selected by the action of a coil 37 which is connected with the alternator field control circuits as will be hereinafter explained.

At 32 is shown a relay normally biased to open position and having its coil connected across a portion of the resistance 31 in the amplifier control circuit. This relay is of the slow closing quick release type and should require from 30 to 60 seconds to close after its coil has been energized. The coil is energized whenever current is flowing through the resistance 31 or in other words whenever the key 30 is in open position. The contacts of the relay 32 are in the control circuit of a relay 33 which is normally biased to closed position and whose contacts are in the circuit connecting the field 3 to its source of energy. A variable resistance 34 is inserted in this field circuit for permitting control of the field current. When the key 30 is closed for the purpose of signaling the coil of relay 32 will be deenergized and this relay will open its associated circuit thereby deenergizing relay 33 which will at once close the field circuit 3. The field circuit will remain closed as long as the key is being operated to send signals and from 30 to 60 seconds thereafter, owing to the slow closing action of the relay 32. When signaling has ceased for this period the relay 32 will again close the control circuit of relay 33 which will automatically open the field circuit of the generator. The system thus far described provides means for automatically removing the generator field after an interval of 30 to 60 seconds after signaling has ceased and for energizing a field immediately after resumption of signaling.

It will be recognized as pointed out above that the effect of removing the field in this manner will have two undesirable effects on the control circuits of the alternator and its driving motor. In the first place the removal of the field changes the load on the alternator driving motor resulting in a tendency to variation in speed of the driving motor; in the second place when the field is replaced on resumption of signaling it does not reach its full value instantaneously but requires an appreciable time interval to reach its normal value. If no means were taken to prevent it the compensating rheostats shown at 23 and 24 would begin to compensate for the keying before the alternator field had reached its full strength and therefore before there is necessity for such compensation. Both of these effects must be corrected for, that is the speed regulator S must be provided with means for compensating for the additional change in load represented by the switching on and off of the alternator field and the control elements for the compensating rheostats must be delayed in their operation sufficiently to permit the field current to reach its full strength.

The change in load on the alternator driving motor resulting from the switching on and off of the alternator field is compensated for by a coil 37 on the speed regulator S and the action on the compensating rheostats is corrected for by the action of the quick closing slow release relay 35. These coils are connected in series across the contacts of the relay 33. When the relay 33 is open these coils will both be energized, opening the contacts of the relay 35 and maintaining the pivoted contact 38 in its upper position. The energizing circuit of these coils under these conditions extends through the alternator field 3. When the relay 33 is deenergized its contacts are closed and the coil of relay 35 and coil 37 are short-circuited thus permitting the relay 35 to close the control circuits of the compensating rheostat relays 25 and 26 placing them under control of the key 30 and allowing the pivoted contact 38 to resume its lower position.

The operation of the device is as follows: The diagram shows the condition of the circuits when the key 30 is opened, that is when no signals are being sent. In this position there will be current flowing through the saturation circuit of the magnetic amplifier 28 and the drop in the resistance 31 will energize relay 32 which will hold its contacts closed. The relay 33 is now energized holding its contacts open, thereby opening the field circuit of the alternator and removing the short circuit about the coils 35 and 37. The latter are therefore both energized, the control circuit of the compensating rheostat relays 25 and 26 is open and the contact 38 is held in its upper position. Under these circumstances the alternator 1 will be driven at its normal constant speed, the difference in load, owing to the absence of current in the field 3 being compensated for by the fact that the pivoted contact 38 is in its upper position and, therefore a lesser tendency for a change in speed of the alternator 1 will cause closure of the contacts 38 and 39, thus effecting the proper correcting action on the voltage regulator S. When signaling commences the current through the resistance 31 will be interrupted, the relay 32 will immediately open its contacts, deenergizing the relay 33 which will automatically close the circuit of field 3 and at the same time short circuit the coil of relay 35 and the coil 37 allowing the former after a short time interval to close the circuit connecting the relays 25 and 27 to the connecting circuit and allowing the pivoted contact 38 to drop to its lower position. The increased load of the alternator owing to the switching on of this field is of course compensated for as far as the speed control is concerned by a change in position of the contact 38, while owing to the slow release relay 35 the compensating rheostats 23 and 24 will put under the control of the keying circuit only after the field has obtained its full strength. These conditions persist as long as the keying continues and for a brief interval thereafter. After the keying has ceased for from 30 to 60 seconds the relay 32 again closes its contacts energizing the relay 33 and causing it to open the field circuit and remove the short circuit around the coils 35 and 38. The former thereupon opens the control circuit of the compensating rheostat relays 25 and 26 and the latter again shifts the contact 38 to its upper position. Conditions are then again as represented in the drawing. It will be clear, therefore that I have disclosed a system in which the field of the alternator is removed whenever the alternator load is removed and have also provided means for preventing a change in load of the driving motor due to the switching on and off of the field from affecting the speed control device of the motor and have likewise provided means for preventing the compensating rheostats from operating too soon after the main alternator field circuit has been closed. While I have shown a particular system of relays for accomplishing these several purposes it is obvious that many modifications will readily occur to those skilled in the art and that furthermore the system itself is applicable under many different circumstances, the particular arrangement shown being merely suggested by way of example. I intend to be limited therefore only as indicated by the scope of the following claims.

Having described my invention, I claim:

1. In a transmitter system, a high frequency generator, means for energizing said generator to cause it to generate a normal signaling voltage, signal initiating means associated with said generator, means for controlling said energizing means to automatically maintain said generator at normal voltage during signaling and to automatically reduce the voltage of said generator substantially below normal a predetermined time after the cessation of signaling and frequency regulating means for automatically maintaining the frequency of said generator constant.

2. In a transmitter system, a high frequency generator, means for energizing said generator to cause it to generate a normal signaling voltage, signal initiating means associated with said generator, frequency regulating means for maintaining the frequency of said generator constant, controlling means for said energizing means to automatically maintain said generator at normal voltage during signaling and to automatically reduce the voltage of said generator substantially below normal a predetermined time after cessation of signaling, said frequency regulating means comprising means for compensating for tendencies to vary the frequency owing to the change of voltage of said generator at the commencement of cessation of signaling.

3. In a transmitter system, a high frequency generator, an energizing circuit for said generator, signaling initiating means associated with said generator and frequency regulating means for maintaining the frequency of said generator constant, and means comprising a slow acting relay for automatically opening said energizing circuit a predetermined time after cessation of signaling, said frequency regulating means comprising means controlled by said relay for compensating for tendencies to change in frequency resulting from the opening and closing of said energizing circuit.

4. In a transmitter system, a high frequency alternator, a field circuit therefor, a signaling circuit connected to said alternator and signal initiating means for varying the power supplied to said signaling circuit by said alternator, a driving motor for said alternator and means responsive to the output frequency of said alternator for maintaining the speed of said driving motor constant, means associated with said signaling circuit for automatically opening said field circuit on cessation of signaling and means incorporated in the motor speed control means and responsive to the means for opening the field circuit for compensating for tendencies to change said motor speed resulting from the change in load due to opening of the field circuit.

5. In a transmitter system, a high frequency alternator, a field circuit therefor, a signaling circuit connected to said alternator and signaling initiating means for varying the power supplied to said signaling circuit by said alternator, a slow acting relay associated with said signaling circuit for opening said field circuit a predetermined time after cessation of signaling, a driving motor for said alternator and speed regulating means therefor responsive to the output frequency of said alternator said speed regulating means comprising means controlled by said relay for compensating for tendencies to change the motor speed resulting from the opening of the alternator field circuit.

6. In a transmitter system, a high frequency alternator, a field circuit therefor, a signaling circuit connected to said alternator and signal initiating means for varying the power supplied to said signaling circuit by said alternator, means associated with said signaling circuit for automatically opening said field circuit when signaling ceases and for automatically closing said field circuit when signaling commences, a motor for driving said alternator comprising a stator circuit and a rotor circuit, means associated with said stator circuit and responsive to the frequency of the alternator for regulating the speed of said motor, said means including means responsive to the opening and closing of the alternator field circuit for compensating for the effects due to opening and closing of the alternator field circuit on the motor speed, means associated with said rotor circuit and responsive to changes in load due to signaling for compensating for the effect of such changes on the motor, and means associated with said last named means for delaying the action thereof when signaling starts.

7. In a transmitting system, an electromagnetic source of high frequency energy and a field circuit therefor, a load circuit coupled to said source, and a signal initiating means for varying the power supplied to said load circuit by said source, means controlled by said signal initiating means for substantially removing said field, a predetermined time after signaling ceases and restoring said field simultaneously with resumption of signaling, a driving means for said high frequency source, load compensating means associated with said driving means adapted to compensate for load changes on said high frequency source, and means controlled by said signal initiating means for connecting said compensating means with said driving source at a time when the field of said high frequency source has reached a normal value.

8. In a transmitting system, an electromagnetic source of high frequency energy and a field circuit associated therewith, a load circuit coupled with said source, and signal initiating means for varying the power supplied to said load circuit by said source, means controlled by said signal initiating means for substantially removing said field at a predetermined time after signaling ceases and restoring said field simultaneously with a resumption in signaling, a driving motor for said high frequency source, a control motor associated with said driving motor, a speed regulating device associated with said high frequency source and said driving motor, said device being responsive to a change in the frequency of said high frequency source and a change in the field strength of said controlling motor caused by changes of frequency in said high frequency source, and load compensating means associated with said driving motor for compensating for changes of load in said high frequency source, said load compensation being controlled by said signal initiating means and adapted to be inserted in the rotor circuit of said driving motor at a time when the field strength of said high frequency source has reached a normal value.

9. The method of field control in an electromagnetic high frequency transmission source, which comprises, substantially reducing the strength of the field on the said source at a predetermined time after the cessation of signals, rebuilding the said field strength simultaneously with a resumption of signals, controlling the speed of the source in proportion to the source voltage, and supplying extra power after rebuilding the field strength to the full value at such a time that no speed change is required.

JAMES L. FINCH.